United States Patent
Ravas, Jr. et al.

[11] Patent Number: 5,459,449
[45] Date of Patent: Oct. 17, 1995

[54] METHOD AND APPARATUS FOR DIAGNOSING SHORTS IN A SIR SYSTEM

[75] Inventors: Richard J. Ravas, Jr.; Kevin D. Kincaid, both of Kokomo, Ind.

[73] Assignee: Delco Electronics Corporation, Kokomo, Ind.

[21] Appl. No.: 208,172

[22] Filed: Mar. 10, 1994

[51] Int. Cl.⁶ ............................................. B60Q 1/00
[52] U.S. Cl. .................... 340/438; 340/514; 340/649; 340/650; 340/662; 340/663; 280/735
[58] Field of Search .................... 280/734, 735; 340/436, 438, 514, 649, 650, 661, 662, 663

[56] References Cited

U.S. PATENT DOCUMENTS 4,243,971  1/1981  Suchowerskyj et al. ............. 340/436
5,155,376 10/1992  Okano ................................. 280/735

*Primary Examiner*—John K. Peng
*Assistant Examiner*—Daryl C. Pope
*Attorney, Agent, or Firm*—Mark A. Navarre

[57] ABSTRACT

Air bags are deployed by firing circuits each containing a squib in series with a common control switch, and a control containing an accelerometer and a microprocessor for operating the switch to deploy the air bags. To diagnose shorts, a current source feeds a trickle current through each squib and a current limited voltage regulator across the switch passes the combined trickle currents to ground. The microprocessor senses the voltage across the switch via an A/D converter. That voltage goes low for a short to ground and high for a short to battery voltage.

9 Claims, 1 Drawing Sheet

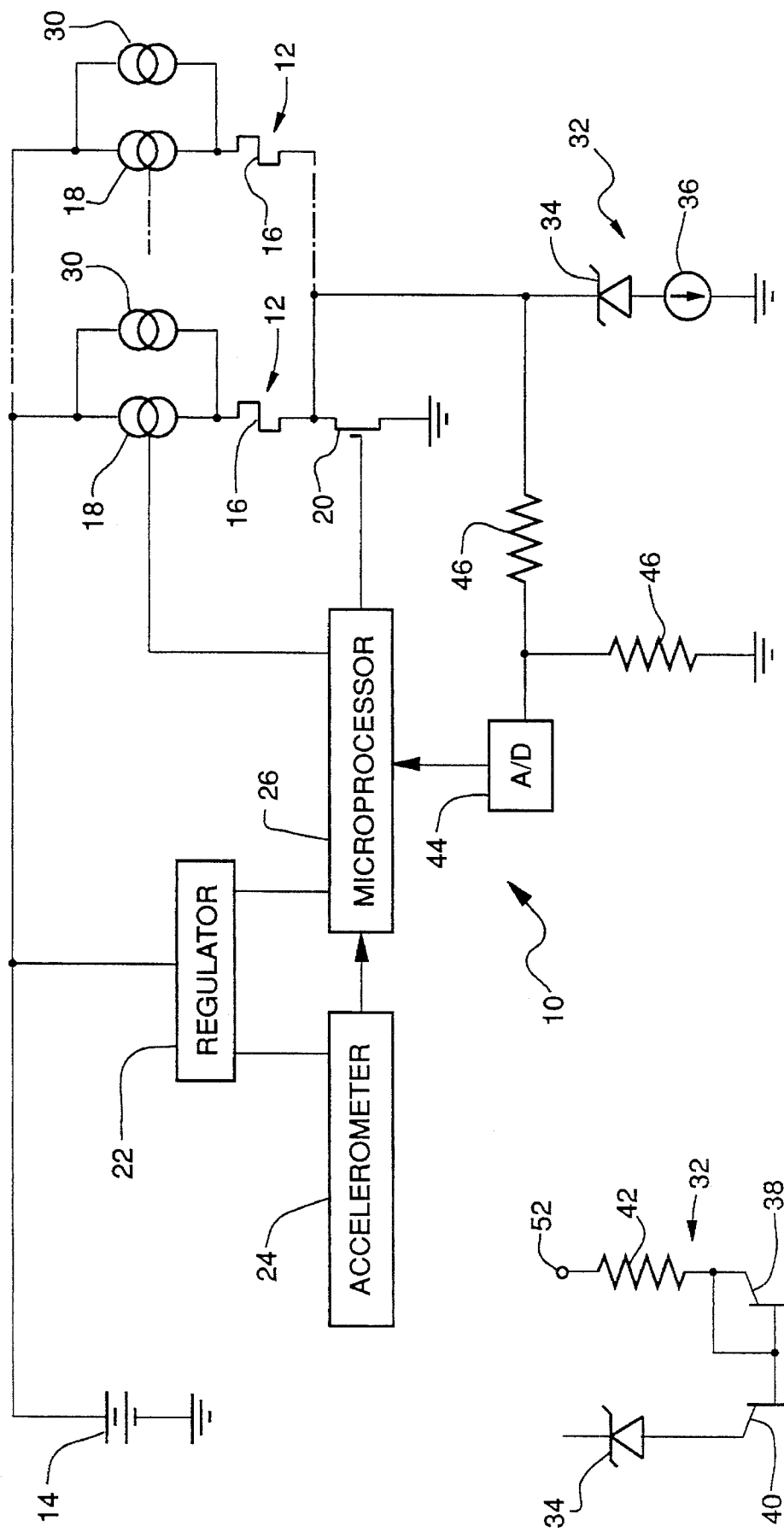

METHOD AND APPARATUS FOR DIAGNOSING SHORTS IN A SIR SYSTEM

FIELD OF THE INVENTION

This invention relates to supplemental inflatable restraint systems for automotive vehicles and particularly to a method and an apparatus for detecting shorts of a SIR firing circuit to ground or to its supply voltage.

BACKGROUND OF THE INVENTION

Supplemental inflatable restraint (SIR) systems for automotive vehicles generally employ a firing circuit having a squib for causing inflation of an air bag, and a deployment circuit having an accelerometer sensitive to vehicle motion, especially deceleration, and a microprocessor monitoring the accelerometer output for evaluating the severity of a crash to determine whether to deploy the air bag. The vehicle battery or ignition system voltage empowers the deployment circuit and the firing circuit. The deployment circuit and the firing circuit are to a large extent embodied with a microprocessor on an integrated circuit chip, but an external harness leads to the squib at the site of the air bag, or in the event the vehicle is equipped with two or more air bags, the harness connects the squib for each air bag to the chip.

It is conceivable that some portion of the harness might become damaged and short to ground or even to the vehicle battery voltage. To forestall the possibility that such inadvertent electrical connection to the firing circuit might cause deployment of the air bag or disable the system, it is desirable to monitor the system to detect any such event. It is already known to diagnose a short of the firing circuit by feeding a small test current through the squib and through a biasing resistor to ground. The resulting bias voltage will depend on the current and if there are no shorts to the firing circuit the resulting test voltage will be at a prescribed value. To assure this, the test current is carefully controlled. Where, for example, the current is provided by a current source on an integrated circuit, the circuit must be trimmed during manufacture to assure the correct current output. The test voltage is sampled by an A/D converter and fed to the microprocessor where it is monitored to detect a low value indicative of shorting to ground or a high value indicative of shorting to supply voltage.

Since the number of inflatable restraints per vehicle varies according to vehicle design, it is desirable to provide a SIR system to accommodate any number of restraints expected to be employed. This has been accomplished previously by designing the diagnostic circuit for the maximum number of air bags—that is, tailoring the current sources and the bias resistor to give a desired test voltage. Then if a given vehicle has fewer than the maximum number, the SIR harness is modified to couple current sources across the connections where the "missing" squibs would have been connected, to properly bias the resistor to the desired test voltage. This arrangement is not desirable from the vehicle manufacturers point of view, resulting in costs which might be avoided; also the need to trim the current sources increases system cost.

SUMMARY OF THE INVENTION

It is therefore an object of the invention to diagnose shorts of a SIR firing circuit using hardware which operates independently of the number of firing circuits and requires no harness modifications to adjust for the number of firing circuits.

According to the invention, each firing circuit is equipped with a current source like that used in the prior art, except that the sources need not be trimmed for accuracy; the current may vary as much as 50% from its nominal rating. For each firing circuit, the current is passed through the squib and then to ground through a current limiting voltage regulator preferably common to all the firing circuits. The regulator develops the same test voltage whether one or more current sources are feeding it, provided that the applied voltage and current is in a range consistent with a healthy system. If, however, a firing circuit is grounded, the regulator will be unable to sustain the test voltage. Similarly, the regulator maximum current is limited so that if a high voltage is presented by shorting to the vehicle battery voltage, the test voltage will increase above the regulated value. This limitation is provided by a current sink which passes currents only up to its design capacity. An A/D converter will monitor the test voltage and send it to the system microprocessor for evaluation, detecting abnormally high or low voltages indicative of shorts. Thus since the regulator is relatively insensitive to variations in the diagnostic currents, the accuracy of each current source and variation in the number of current sources, expensive current source trimming and harness modifications are not required.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic diagram of a SIR system including a diagnostic circuit according to the invention; and FIG. 2 is a schematic diagram of a portion of the diagnostic circuit of FIG. 1.

DESCRIPTION OF THE INVENTION

Referring to FIG. 1, a typical supplemental inflatable restraint system includes a deployment circuit or controller 10, and one or more firing circuits 12 depending on the number of air bags installed in a given vehicle, and a battery 14 supplying ignition voltage to the system. Each firing circuit 12 has a squib 16 connected at one side through a current source 18 to the battery 14 and connected at the other side through a common FET switch 20 to ground. The deployment circuit 10 comprises a regulator 22 coupled to the battery 14 for producing a regulated 5 volts for operating the other circuit elements, an accelerometer 24, and a microprocessor 26 for analyzing the accelerometer output and controlling the firing circuits 12. As is well known in the art, the microprocessor 26 analyzes the accelerometer output to determine crash severity and to operate the current sources 18 and the FET switch 20 when appropriate, to fire the squibs. The acceleration signal, during a crash is a rapidly oscillating signal which is analyzed by an algorithm to determine severity. A suitable microprocessor-based severity control is disclosed in the co-pending U.S. patent application Ser. No. 07/797,850, filed Nov. 26, 1991, assigned to General Motors Corporation, and which is incorporated herein by reference.

Diagnosis of the firing circuits is accomplished by incorporating a small current source 30 across each main current source 18 for continuously supplying a diagnostic current through the associated squib 16 and through a common regulating device 32 to ground. The regulating device is coupled across the FET switch 20 and comprises a Zener diode 34 and a current sink 36 in series to regulate the voltage and limit the current. A number of current limited voltage regulators are known in the art and are appropriate for use in this application. For example, a current sink commonly used in integrated circuits is depicted in FIG. 2 along with the Zener diode 34. A transistor 38 and a transistor 40 have bases tied together and tied to the collector of transistor 38 and both emitters are grounded. The collector of transistor 40 is coupled to the Zener diode to handle the diagnostic current. The two transistors have equal base areas and will pass equal currents. The current is controlled by a resistor 42 connected to the collector or transistor 38 and to the regulated 5 volts supplied by the regulator. If then, the resistor is 500 ohms, the current through transistor 38 will be 10 mA, and the current through transistor 40 will also be a maximum of 10 mA. The current sources 30 each supply 2 mA diagnostic current, for example, so that several such currents combined can be managed by the current sink 36, even if the current sources are not trimmed and thus vary considerably from their design current value. The Zener diode 34 is selected to provide a regulated voltage of 3 volts, for example. An A/D converter 44 is coupled through voltage dividing resistors 46 to the junction of the squibs and the FET switch to sample the regulated voltage and supply a digital representation of the voltage to the microprocessor.

During normal standby operation the combined diagnostic currents from the current sources 30 flow through the regulating device 32 and the Zener diode maintains a constant 3 volts which is sensed by the A/D converter and the microprocessor. The microprocessor is programmed to detect substantial variations from the 3 volts level to diagnose a short condition. If a short to ground occurs anywhere in the firing circuits 12, the voltage across the regulating device will pull out of regulation and will be detected by the microprocessor. Similarly if there is a short to battery voltage, the regulating device will be overloaded due to the current limiting feature, and the voltage sensed by the microprocessor will be very high. Thus the microprocessor can easily detect a short and determine whether it is a short to ground or battery. The 10 mA current limitation will prevent excessive current flow which might inadvertently deploy a squib should a short to battery occur.

It will thus be recognized that the diagnostic circuit can be inexpensively implemented since the current sources, sinks and diodes are readily incorporated in an integrated circuit chip, and that the current sources do not need to be trimmed. Moreover, since the regulating device is insensitive to current variations over a wide range, the number of firing circuits may be varied without any harness modification to compensate for variations in total diagnostic current.

The principle feature of the invention is the use of current limited low side voltage regulation for the diagnostic circuit. The particular circuit described herein is but one of many possible implementations. As an example of one variation, each firing circuit could have a separate FET switch in series with its squib, and a separate current limited low side current regulator across each FET.

The embodiments of the invention in which an exclusive property or privilege is claimed are defined as follows:

1. In a supplemental inflatable restraint system for an automotive vehicle having one or more air bags, firing circuits each containing a squib for effecting inflation of the bags, and a deployment circuit for determining when air bag inflation should occur and for controlling the firing circuits, the circuits being supplied by vehicle ignition voltage, a diagnostic circuit for detecting shorting of the firing circuit to ground and shorting of the firing circuit to ignition voltage comprising:

a current source connected to a first end of each firing circuit for supplying thereto a predetermined diagnostic current insufficient to fire a squib;

a voltage regulator connected to a second end of each firing circuit for conducting said diagnostic current to ground and for maintaining a regulated voltage at said firing circuits which, in the absence of firing circuit shorting, is independent of the current conducted thereby; and means coupled to said firing circuits for detecting a departure from the regulated voltage indicative of said firing circuit shorting to ignition voltage and said firing circuit shorting to ground.

2. The invention as defined in claim 1 including switch means controlled by the deployment circuit for connecting the squibs to ground, and the voltage regulator for conducting the diagnostic current to ground is connected across the switch means, thereby establishing the regulated voltage at a point between the squibs and the switch means.

3. The invention as defined in claim 1 wherein said restraint system comprises a number of firing circuits, the voltage regulator for conducting the diagnostic current to ground comprises a single path for all diagnostic current of the firing circuits, and the regulated voltage is substantially independent of the number of firing circuits.

4. The invention as defined in claim 1 wherein the voltage regulator comprises a voltage regulating device for maintaining a substantially constant voltage drop over a range of diagnostic current corresponding to various numbers of firing circuits and a current limiting device for passing only current insufficient to fire a squib.

5. The invention as defined in claim 3 wherein the voltage regulator comprises a Zener diode for maintaining a constant voltage provided the firing circuit is not shorted, and a current sink in series with the Zener diode for limiting current through the regulating means to a level insufficient to fire a squib.

6. In a SIR system having one or more firing circuits for inflating air bags and a deployment circuit for activating the firing circuits, a method of detecting shorts of the firing circuit to ground and shorts of a firing circuit to a supply voltage comprising the steps of:

passing diagnostic current through each firing circuit at a level insufficient to cause air bag inflation;

conducting the diagnostic current to ground while developing a test voltage on the firing circuits, the test voltage being maintained at a substantially constant value independent of the magnitude of the diagnostic current in the absence of shorting of the firing circuits but varying from said constant value in the event of said shorting; and monitoring the test voltage to detect test voltages indicative of shorting to ground and shorting to the supply voltage.

7. The invention as defined in claim 6 wherein the step of regulating includes:

limiting current flow to values insufficient to cause deployment in the event of shorting to the supply voltage, whereby upon shorting to the supply voltage the test voltage increases to a level above the constant level.

8. The invention as defined in claim 6 wherein in the event of shorting a firing circuit to ground the test voltage decreases to a level below the constant level.

9. The invention as defined in claim 6 wherein the regulating step is limited to regulation over a limited voltage range of firing circuit voltages, and the range is exceeded in the event of shorting so that the test voltage changes to a level indicative of the shorting.

* * * * *